US009875291B2

(12) United States Patent
Rickard

(10) Patent No.: US 9,875,291 B2
(45) Date of Patent: Jan. 23, 2018

(54) METHOD FOR VISUALIZING DEGREE OF SIMILARITY AND DIFFERENCE BETWEEN A LARGE GROUP OF OBJECTS AND A REFERENCE OBJECT

(71) Applicant: VMware, Inc., Palo Alto, CA (US)

(72) Inventor: Jeremy Rickard, Colorado Springs, CO (US)

(73) Assignee: VMware, Inc., Palo Alto, CA (US)

( * ) Notice: Subject to any disclaimer, the term of this patent is extended or adjusted under 35 U.S.C. 154(b) by 648 days.

(21) Appl. No.: 14/310,646

(22) Filed: Jun. 20, 2014

(65) Prior Publication Data

US 2015/0370876 A1 Dec. 24, 2015

(51) Int. Cl.
*G06F 9/455* (2006.01)
*G06F 7/58* (2006.01)
*G06F 17/30* (2006.01)

(52) U.S. Cl.
CPC .... *G06F 17/30572* (2013.01); *G06F 9/45558* (2013.01); *G06F 2009/45591* (2013.01)

(58) Field of Classification Search
CPC ..... G06F 17/30572; G06F 2009/45591; G06F 9/45558
See application file for complete search history.

(56) References Cited

U.S. PATENT DOCUMENTS

| 2004/0143423 | A1* | 7/2004 | Parks | G06F 19/26 702/194 |
| 2014/0223428 | A1* | 8/2014 | Hackett | G06F 9/5088 718/1 |
| 2014/0375650 | A1* | 12/2014 | Grundstrom | G06T 11/206 345/440 |
| 2015/0113529 | A1* | 4/2015 | Zhong | G06F 9/5077 718/1 |

OTHER PUBLICATIONS

Machine translated, Zhong, CN103791462 Published on May 14, 2014.*

* cited by examiner

*Primary Examiner* — Sing-Wai Wu
(74) *Attorney, Agent, or Firm* — Patterson & Sheridan LLP

(57) ABSTRACT

Techniques are disclosed for generating a visualization of differences between objects in a plurality of objects and a reference object. For each object in the plurality of objects, a widget performs the following steps. The widget retrieves a plurality of parameter values associated with the object. For each parameter value in the plurality of parameter values, the widget retrieves a reference value of the reference object corresponding to the parameter value, computes a difference between the parameter value and the reference value, and updates a difference indicator based on the computed difference. The widget selects an angle related to the difference indicator. The widget computes a location in a display screen region associated with the object based on the difference indicator and the selected angle.

20 Claims, 7 Drawing Sheets

METHOD FOR VISUALIZING DEGREE OF SIMILARITY AND DIFFERENCE BETWEEN A LARGE GROUP OF OBJECTS AND A REFERENCE OBJECT

BACKGROUND

General configuration management of large systems typically involves comparing objects, such as host computer systems or virtual machines, against a reference object. Objects that are originally configured to be similar to the reference object may change over time, resulting in objects that differ from the reference object. Objects under configuration management that differ from the reference object are identified and corrected, bringing such objects back into similarity with the reference object. Similarly, objects subject to a regulatory compliance policy may be out of compliance with that policy, exposing the entity responsible for the objects to potentially large fines or other liability. Objects subject to such regulations that differ from the reference policy are identified and corrected, bringing objects into compliance with the regulatory policy.

One approach to identifying objects that differ from the reference object is to tabulate the properties of each object against the properties of the reference object. A configuration manager visually scans the tabulated properties, looking for objects that differ from the reference object. One drawback with this approach is that the size of the tabulated properties becomes quite large when the objects to compare with the reference object number in the hundreds or the thousands. Visual comparison of the objects in such large systems is time consuming and prone to human error. Consequently, objects that are out of conformity or compliance may not be identified, resulting in reduced system performance or increased liability.

SUMMARY

One or more embodiments provide techniques to identify degree of similarity or differences between each object in a group of objects against a reference object. A method of generating a visualization of differences between objects in a plurality of objects and a reference object according to an embodiment includes the steps of, for each object in the plurality of objects: (1) retrieving a plurality of parameter values associated with the object; (2) for each parameter value in the plurality of parameter values, retrieving a reference value of the reference object corresponding to the parameter value, computing a difference between the parameter value and the reference value, and updating a difference indicator based on the computed difference; (3) selecting an angle related to the difference indicator; and (4) computing a location in a display screen region associated with the object based on the difference indicator and the selected angle.

Further embodiments include a non-transitory computer-readable storage medium comprising instructions that cause a computer system to carry out one or more of the above methods as well as a computer system configured to carry out one or more of the above methods.

Advantageously, objects out of conformity or compliance with a reference object are readily identified. Objects are depicted graphically as a function of the level of difference between each object and the reference object. As a result, a configuration manager may quickly and reliably identify objects that are most out of conformance or compliance. The configuration manager may prioritize correction of objects that exhibit the highest level of difference from the reference object. As a result, the likelihood of not identifying and correcting an out of conformance or out of compliance object is reduced, improving configuration management quality.

DETAILED DESCRIPTION

Figure 1:
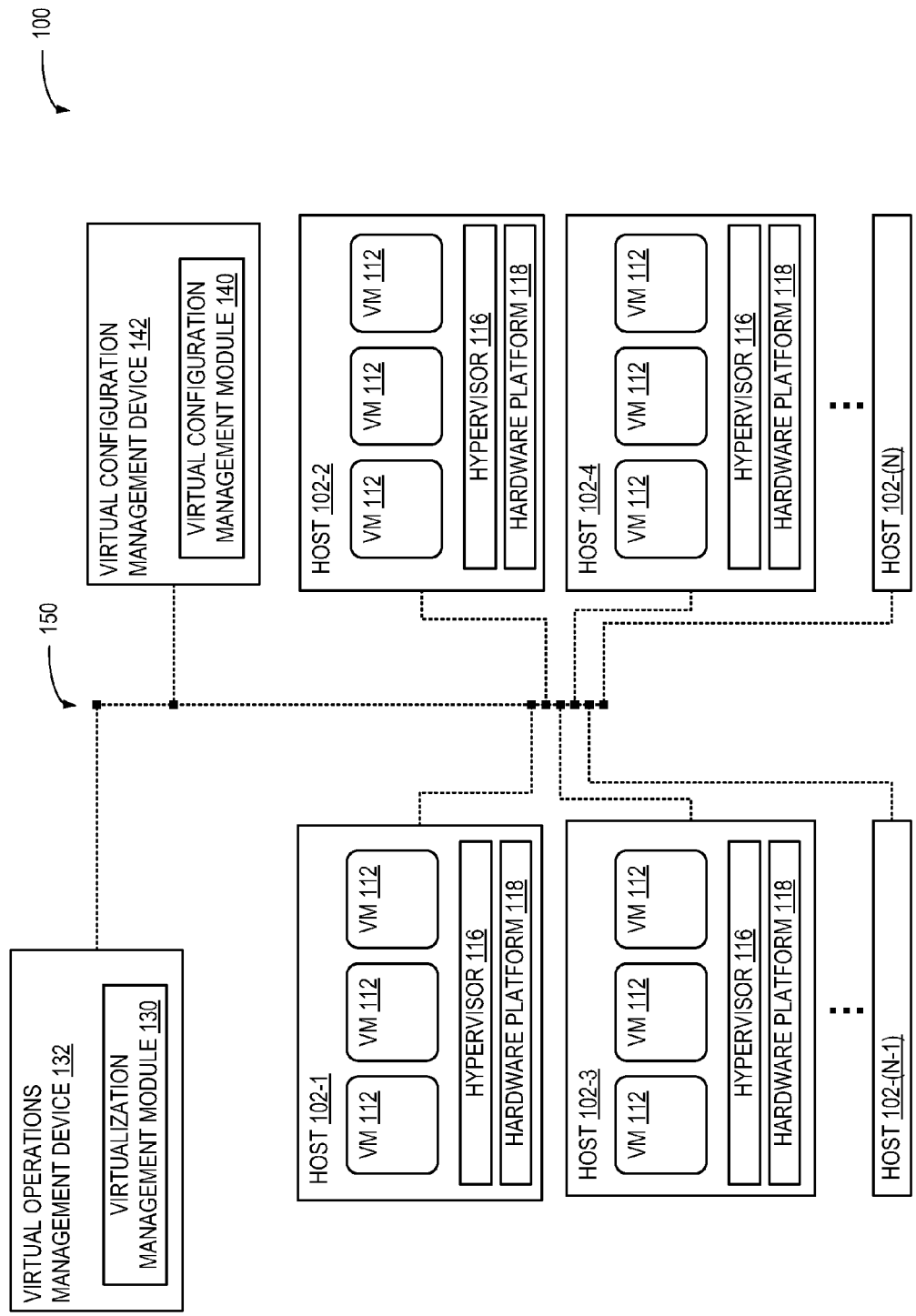
FIG. 1 depicts one architecture of a virtualized computing system within which embodiments may be implemented.

FIG. 1 depicts one architecture of a virtualized computing system 100 within which embodiments of that may be implemented. As illustrated, virtualized computing system 100 includes a plurality of host computers (identified as hosts 102-1, 102-2, 102-3, 102-4, . . . 102-N) and referred to collectively as hosts 102. In one embodiment, hosts 102 are communicatively coupled to each other and to a virtualized operations management device 132 and a virtual configuration management device 142 via a network 150.

Each host 102 is configured to provide a virtualization layer that abstracts processor, memory, storage, and networking resources of a hardware platform 118 into multiple virtual machines (VMs) 112 that run concurrently on the same host 102. The VMs 112 run on top of a software interface layer, referred to herein as a hypervisor 116, that enables sharing of the hardware resources of host 102 by the VMs 112. One example of hypervisor 116 that may be used in an embodiment described herein is a VMware ESXi® hypervisor provided as part of the VMware vSphere® solution made commercially available from VMware, Inc.

Virtualized computing system 100 includes a virtualization management module 130 that may communicate to the plurality of hosts 102 via network 150. In one embodiment, virtualization management module 130 is a computer program that resides and executes in a central server, such as a virtual operations management device 132 residing in virtualized computing system 100, or alternatively, running as a VM 112 in one of hosts 102. One example of a virtualization management module 130 is the vCenter™ Server product made available from VMware, Inc. Virtualization management module 130 is configured to carry out administrative tasks for virtualized computing system 100, including managing hosts 102, managing VMs 112 running within each host 102, provisioning VMs 112, migrating VMs 112 from one host to another host, and load balancing between hosts 102. In one embodiment, virtualization management module 130 is configured to communicate with hosts 102 to collect performance data and generate performance metrics (e.g., counters, statistics) related to availability, status, and performance of hosts 102 and VMs 112.

Virtualized computing system 100 further includes a virtual configuration management module 140 that may communicate to the plurality of hosts 102 and to one or more virtualization management modules 130 via network 150. In one embodiment, virtual configuration management module 140 is a computer program that resides and executes in a central server, such as a virtual configuration management device 142 residing in virtualized computing system 100, or alternatively, running as a VM 112 in one of hosts 102. Virtualization management module 130 and virtual configuration management module 140 may reside and execute in the same physical machine or in different physical machines. One example of a virtual configuration management module 140 is the vCenter® Operations Manager product made available from VMware, Inc. Virtual configuration management module 140 is configured to provide visibility of performance, capacity and health for virtualized computing system 100, including identifying anomalies, faults, and high workload in hosts 102 and VMs 112, identifying the source of such anomalies, faults, and high workload conditions, providing alerts of potential degradation within virtualized computing system 100, and forecasting future workload requirements for hosts 102 and VMs 112.

In one embodiment, virtual configuration management module 140 is configured to communicate with hosts 102 and virtualization management module 130 to collect and compare properties, characteristics, and parameters (referred to hereinafter as properties) of different objects, or different instances of a given object, against a reference object, and identify the level of conformance for each object versus the reference object. The objects may be any physical or virtual computing resource, including, without limitation, hosts 102, VMs 112, data center, or other networked device. Corresponding properties of the objects may include, without limitation, quantity of central processing units (CPUs), amount of disk storage, amount of memory, the identity of one or more storage arrays assigned to the object, and identity of the host 102 assigned to the object.

In another embodiment, virtual configuration management module 140 is configured to communicate with hosts 102 and virtualization management module 130 to collect and compare compliance of objects, such as hosts 102 and VMs 112, against requirements related to a reference compliance policy. The reference compliance policy may be any relevant regulatory or other policy, including, without limitation, the Health Insurance Portability and Accountability Act (HIPAA) standard, the Payment Card Industry Data Security Standard (PCI DSS), and the Security Technical Implementation Guides (STIGs) from the Defense Information Systems Agency (DISA) of the United States Department of Defense (DoD). Corresponding requirements may include, without limitation, whether a firewall is installed and maintained, whether a vendor-supplied system password has been changed, whether transmissions over public networks are encrypted, and whether a unique identifier is assigned to each person authorized to access a particular database.

Virtual configuration management module 140 maps the comparisons of a group of objects against the reference object or reference policy to a visualization for display, as further described below.

Figure 2A:
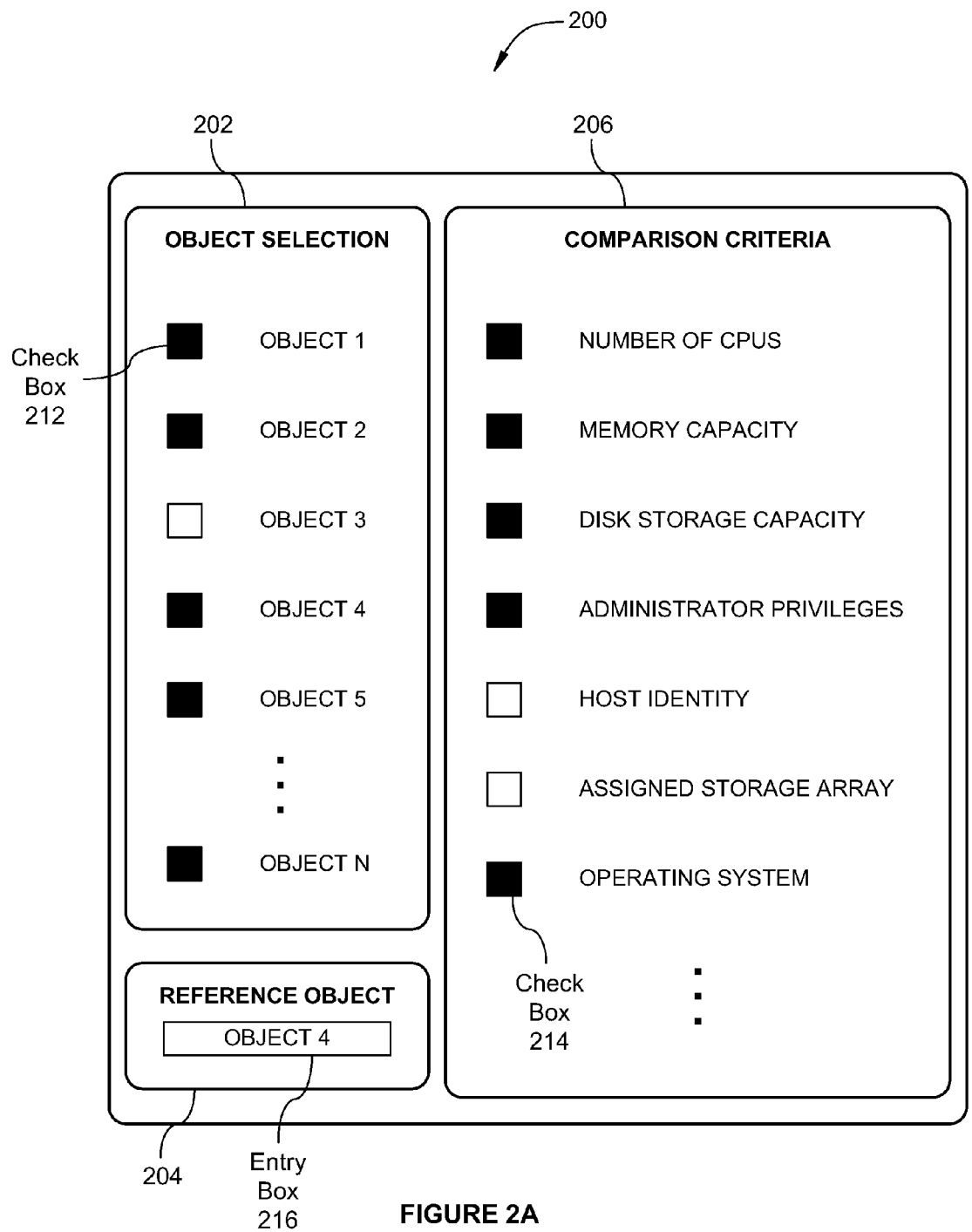
FIG. 2A illustrates an exemplary user interface screen for selecting comparison criteria associated with a visualization, according to one or more embodiments.

FIG. 2A illustrates an exemplary user interface screen 200 for selecting comparison criteria associated with a visualization, according to one or more embodiments. As shown, user interface screen 200 includes an object selection window 202, a reference object window 204, and a comparison criteria window 206.

Object selection window 202 displays a list of objects that may be selected for comparison. Each object in object selection window 202 is associated with a check box such as check box 212. A user, such as a system administrator, selects objects for comparison by selecting corresponding check boxes. As shown, object 1, object 2, object 4, object 5, and object N are selected for comparison. Object 3, by contrast, is not selected for comparison.

Reference object window 204 displays the identifier of the object from that is selected as the reference object. A user identifies the reference object via any technically feasible technique, such as, for example, typing the identifier of the reference object into entry box 216 within reference object window 204.

Comparison criteria window 206 displays a list of criteria that may be selected for comparison. Each criterion in comparison criteria window 206 is associated with a check box such as check box 214. A user selects criteria for comparison by selecting corresponding check boxes. As shown, the number of CPUs, memory capacity, disk storage capacity, screen resolution, and operating system are selected as comparison criteria. In one embodiment, no comparison criteria are specified by the user, and all relevant comparison criteria may be initially selected for comparison. In such an embodiment, the user, after viewing the resulting visualization, may optionally select a subset of the relevant comparison criteria to refine the visualization as desired.

Once objects are selected for comparison, a reference object is identified, and comparison criteria are selected, a visualization of the compared objects is generated, as further described below.

Figure 2B:
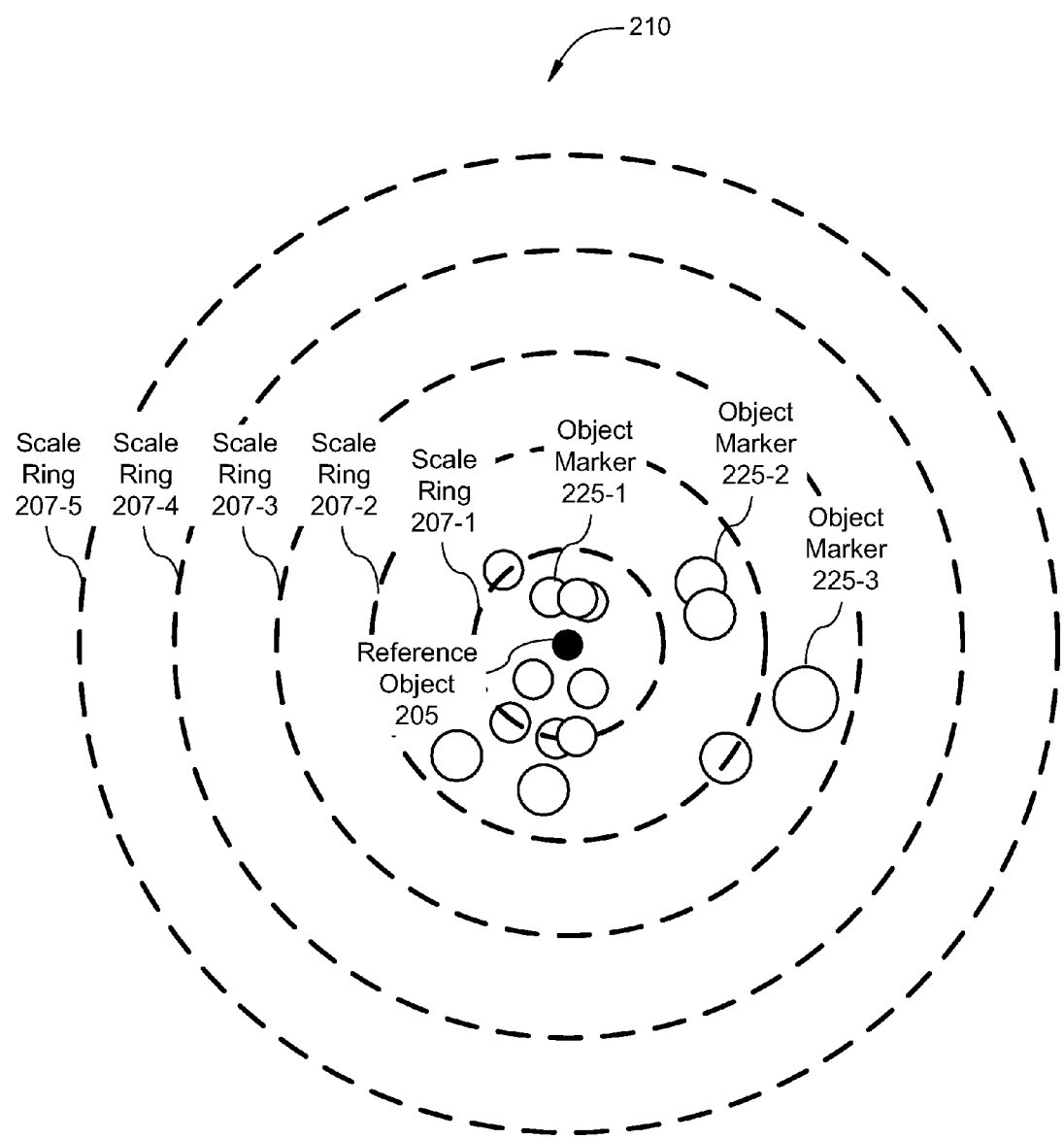
FIG. 2B illustrates an exemplary visualization of a group of objects based on the selected comparison criteria from FIG. 2A, according to one or more embodiments.

FIG. 2B illustrates an exemplary visualization 210 of a group of objects based on the selected comparison criteria from FIG. 2A, according to one or more embodiments.

As shown, visualization 210 includes reference object 205 and object markers, such as object markers 225-1, 225-2, and 225-3. Visualization 210 also includes a plurality of scale rings (identified as scale rings 207-1, 207-2, 207-3, 207-4, 207-5) and referred to collectively as scale rings 207. For clarity, visualization 210 is illustrated with five scale rings 207. However, visualization 210 may include any quantity of two or more scale rings 207, within the scope of this disclosure. Visualization 210 resembles a target with a "bull's-eye" in the center, the bull's-eye representing reference object 205. Each compared object is placed on visualization 210 around reference object 205 at a radial distance from reference object 205 that represents the degree of difference of the compared object from reference object 205.

Scale rings 207-1, 207-2, 207-3, 207-4, and 207-5 represent increasing levels of difference between a compared object and reference object 205. For example, a compared object placed on or near scale ring 207-2 would have a greater difference versus reference object 205 than a compared object placed on or near scale ring 207-1. Likewise, a compared object placed on or near scale ring 207-3 would have a greater difference versus reference object 205 than a compared object placed on or near scale ring 207-2, and so on. Although scale rings 207 are illustrated as being linearly distributed around reference object 205, any distribution of scale rings 207, such as a logarithmic distribution, could be used within the scope of this disclosure.

The quantity of scale rings 207 is determined based on the quantity of properties compared for each object against reference object 205. For example, visualization 210 illustrates five scale rings 207, indicating five properties would be compared for each object against reference object 205.

Scale rings 207 are proportionally spaced according to a particular scale, such as a linear or logarithmic scale, based on the quantity of properties being compared between the objects and reference object 205, and the dimensions of a display screen region configured to store visualization 210. The display screen region may be any storage area, including, without limitations, a memory space, a pixel space, or a frame buffer, that corresponds to an area on a display screen. The contents of the display screen region may be displayed periodically on the corresponding area of the display screen. In one or more embodiments, a property may be considered to be different if the value of the property of a compared object is not the same as a corresponding property of reference object 205. For example, if the property is the quantity of CPUs, and reference object 205 has two CPUs, then a compared object would be considered different if the compared object has any quantity of CPUs other than two. In one or more embodiments, a property may be considered to be different if the value of the property of a compared object is outside a range that includes a corresponding property of reference object 205. For example, if the property is the amount of memory, and reference object 205 has four gigabytes of memory, then a compared object could be considered if the compared object has an amount of memory less than three gigabytes or more than five gigabytes.

For each compared object, virtual configuration management module 140 computes a difference indicator. As indicated herein, the difference indicator is based on the quantity of properties that are different between the compared object and reference object 205. For example, if no property is different (or outside a specified range) between the compared object and the reference object 205, than the difference indicator would be zero, if one property is different (or outside the specified range), then the difference indicator would be one. In various embodiments, the difference indicator may be any integer or non-integer value that measures a difference between a compared object and the reference object 205, including, without limitation, a quantity of a subset of properties that are different between the compared object and reference object 205, a simple average of differences between parameter values of the compared object and corresponding values of the reference object 205, or a weighted average of differences between parameter values of the compared object and corresponding values of the reference object 205. Virtual configuration management module 140 maps the difference indicator for each compared object to a location in the display screen region at a specific distance from reference object 205 according to the particular linear, logarithmic, or other scale. In one example, the display screen region could have a width of 1000 pixels and a height of 1000 pixels. Virtual configuration management module 140 would place reference object 205 at a location width/2=500 pixels horizontally and height/2=500 pixels vertically from the upper-left corner of the display screen region. Virtual configuration management module 140 would map the difference indicator for each compared object at a particular radial distance from reference object 205 according to the particular linear, logarithmic, or other scale. If the particular scale is linear, and the quantity of compared properties is five, then each unit of difference indicator would represent width/(2*N)=1000/(2*5) or 100 pixels. As a result, virtual configuration management module 140 would map the difference indicator for a compared object with one property that is different from reference object 205 at 100 pixels from reference object 205. Virtual configuration management module 140 would map the difference indicator for a compared object with two properties that are different from reference object 205 at 200 pixels from reference object 205, and so on.

As shown, visualization 210 further includes object markers, as represented by exemplary object markers 225-1, 225-2, and 225-3 and collectively referred to as object markers 225. Virtual configuration management module 140 places each object marker 225 in the display screen region of visualization 210 at a distance from reference object 205 based on the mapped difference indicator, as described above. As shown, object marker 225-1 is located within scale ring 207-1, object marker 225-2 is located within scale ring 207-2, and object marker 225-3 is located within scale ring 207-3.

In some embodiments, the size of each object marker 225 may differ based on a particular function. In such an embodiment, distance of each object marker 225 from the reference object 205 is based on the difference indicator while the size of each object marker is based on the particular function. For example, the size of each object marker 225 could reflect a total "score" of the object with regards to that compliance policy. The position of the object markers 225 relative to the scale rings 207 would indicate the degree of difference among the corresponding objects associated with the object markers 225. The size of the object markers would be inversely related to the score of the corresponding object, where the score could be based on an algorithm that measures the quantity of rules an object passed or failed. Larger object marker 225 size would indicate a "worse" score, enabling a user to more quickly identifying the objects that have the worst scores.

Alternatively, the size of each object marker 225 could reflect a value of an individual metric for the corresponding object, where the individual metric could be selected by a user. The list of individual metrics could include, without limitation, workload, anomalies, time remaining before resources are exhausted, utilization, overall system health, risk, and efficiency. In such cases, a similar group of hosts or virtual machines could be compared, where the size of the object markers 225 would indicate the value of the particular metric. If the particular metric is overall system health, then a smaller object marker 225 size would indicate better overall system health relative to a larger object marker 225 size. Likewise, if the particular metric is workload, then a smaller object marker 225 size would indicate a lower workload relative to a larger object marker 225 size. Two objects that are similarly configured could have similar overall system health but different workloads. The two objects would have a similar object marker 225 sizes when overall system health is selected as the metric but different object marker 225 sizes when workload is selected as the metric. In this way, a user can select a particular metric of interest and identify objects that should be addressed based on the metric, based on the size of the object markers 225.

In one example, objects could be compared based on the selected comparison criteria as shown in FIG. 2A. A partial comparison table based on these comparison criteria is shown below in Table 1.

TABLE 1

| Comparison Criterion | Reference Object | Object 1 | Object 2 | Object 5 | ... |
|---|---|---|---|---|---|
| Number of CPUs | 2 | 2 | 2 | 3 | ... |
| Memory Capacity | 4 GB +/− 1 GB | 4 | 3 | 6 | ... |

TABLE 1-continued

| Comparison Criterion | Reference Object | Object 1 | Object 2 | Object 5 | ... |
|---|---|---|---|---|---|
| Disk Storage Capacity | 40 GB +/− 10 GB | 40 GB | 30 GB | 45 GB | ... |
| Administrator Privileges | No | No | No | No | ... |
| Operating System | OS 1 | OS 1 | OS 2 | OS 1 | ... |
| Difference indicator | N/A | 0 | 1 | 2 | ... |

As can be seen in Table 1, object 1, corresponding to object marker 225-1 has a difference indicator of 0. As a result, object marker 225-1 is placed within the first scale ring 207-1. Object 2 corresponding to object marker 225-2 has a difference indicator of 1. As a result, object marker 225-2 is placed within the second scale ring 207-2. Object 5 corresponding to object marker 225-3 has a difference indicator of 2. As a result, object marker 225-3 is placed within the third scale ring 207-3, and so on.

The angular position of each object marker 225 may be determined via any technically feasible approach, including, without limitation, random placement, placement based on a change type, and placement based on a property value. In one example, if the angular position of each object marker 225 is determined via any random placement, then virtual configuration management module 140 could select a pseudorandom number a compared object, scale the pseudorandom number to fall between 0 and 2π radians, i.e., 0° to 360°), and select the angular position of the compared object based on the scaled pseudorandom number. In another example, virtual configuration management module 140 could categorize each compared object into one of a group of categories. The category could correspond to a recent change in a property value for the compare object, such as a change to a value of a network configuration property, or a change to a value of a CPU property. Each potential category would map to a different angular position for the corresponding object marker 225. Consequently, object markers 225 would be clustered in visualization 210 based on object category. In yet another example, virtual configuration management module 140 could calculate angular position of each object marker 225 based on the value of a selected property, as compared with the value of the same property for reference object 205. If quantity of CPUs is the selected property, and reference object 205 has four CPUs, then object markers 225 corresponding to objects with two CPUs would be placed at one angular position, object markers 225 corresponding to objects with three CPUs would be placed at a different angular position, object markers 225 corresponding to objects with five CPUs would be placed at a another different angular position, and so on. Consequently, object markers 225 would be clustered in visualization 210 based on value of the selected property.

In cases where many objects are similar to reference object 205, object markers 225 for these similar objects cluster around the center of visualization 210. Object markers 225 for objects that differ more significantly from reference object 205 appear closer to the outer perimeter of visualization 210. A user viewing visualization 210 may quickly identify objects exhibiting the greatest difference from reference object 205 as those objects further away from reference object 205. In some embodiments, selecting an object marker 225, via mouse click or other technique, may cause additional data or context related to the corresponding object to be displayed. In some embodiments, selecting an object marker 225, via mouse click or other technique, may trigger an event within virtual configuration management module 140 to aid the user in correcting associated conformance or compliance issues that result in the large difference between the selected object and reference object 205.

Once object markers 225 for each compared object are placed in the display screen region corresponding to visualization 210, the display screen region is transmitted to a display device for display. Reference object 205 and object markers 225 are displayed. In various embodiments, scale rings 207 themselves may or may not be displayed. Alternatively, only the outermost scale ring 207-5 may be displayed. Although the markers illustrated in visualization 210 appear as circles of varying diameter, any suitable marker may be used, within the scope of this disclosure.

Figure 2C:
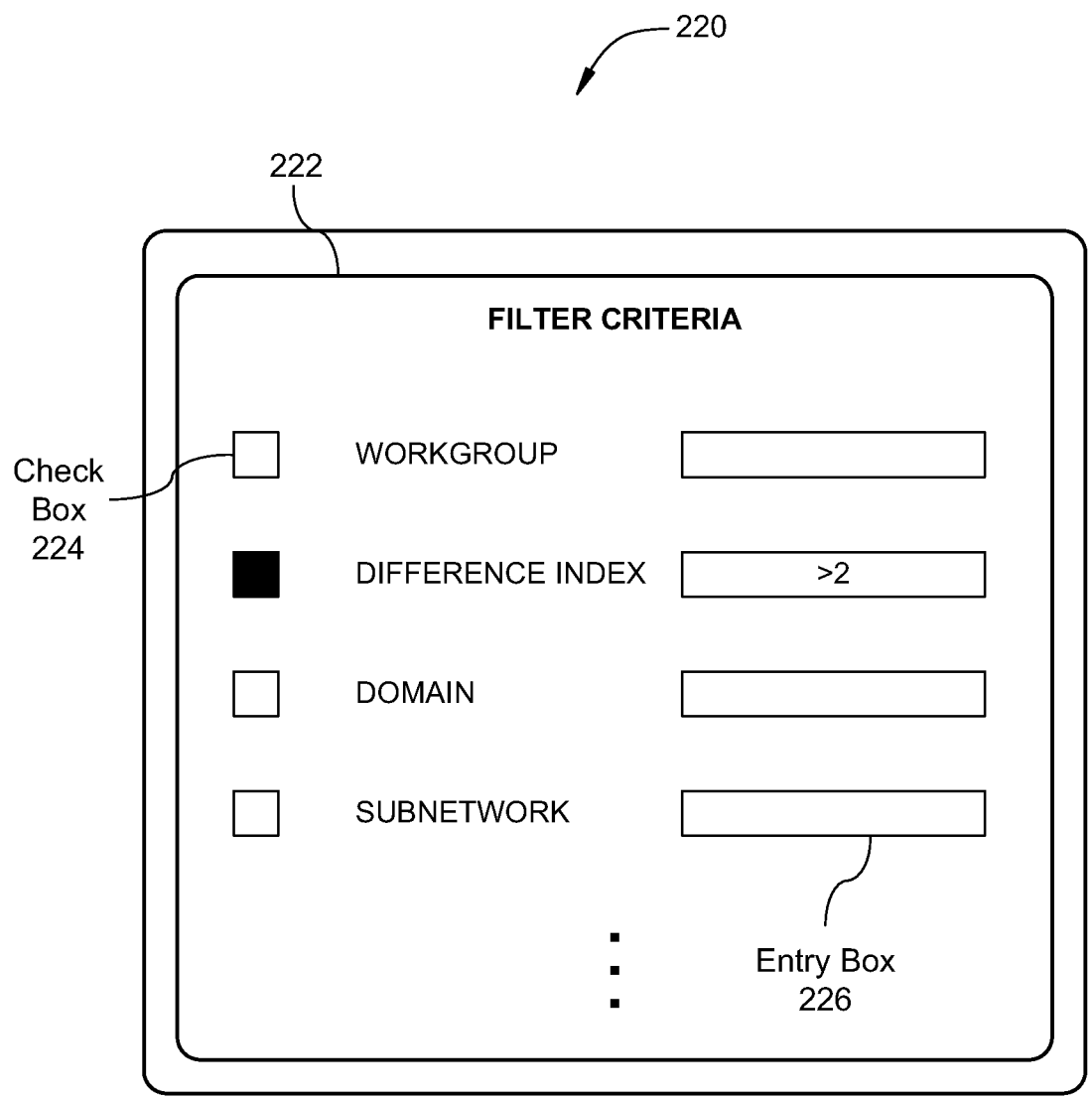
FIG. 2C illustrates an exemplary user interface screen for selecting filter criteria associated with a visualization, according to one or more embodiments.

FIG. 2C illustrates an exemplary user interface screen 220 for selecting filter criteria associated with a visualization, according to one or more embodiments. As shown, the user interface screen 220 includes a filter criteria window 222. In alternative embodiments, filter criteria window 222 may be a window within user interface screen 220 of FIG. 2A or may be a standalone user interface screen as shown in FIG. 2C.

Filter criteria window 222 displays a list of filter criteria that may be selected to determine which objects are compared and visualized. As shown, the filter criteria may include, without limitation, a workgroup, a difference indicator, a domain, and a subnetwork. Each filter criterion in filter criteria window 222 is associated with a check box such as check box 224. Each filter criterion in filter criteria window 222 is also associated with an entry box such as entry box 226. A user selects filter criteria by checking the appropriate check box and entering the filter criterion in entry box 226. As shown, the selected filter criterion specifies those objects associated with a difference indicator that is greater than 2. Objects that meet this filter criterion are selected and visualized, as further described below.

As shown, one of the filter criteria is selected in filter criteria window 222. In another embodiment, two or more filter criteria may be concurrently selected. In such an embodiment, those objects that meet any one or more of the selected filter criteria are compared and visualized. Alternatively, those objects that meet all of the selected filter criteria are compared and visualized.

Figure 2D:
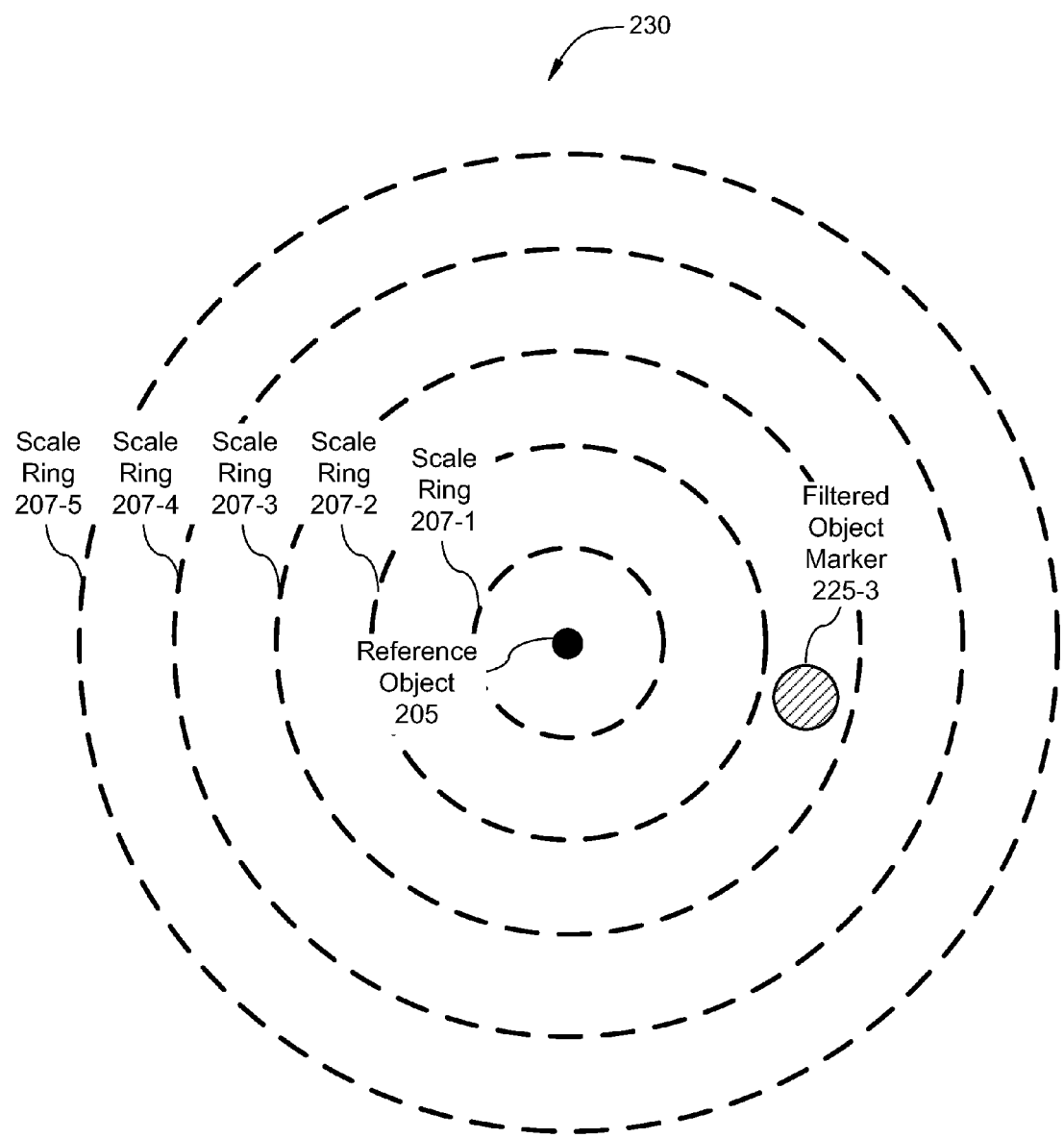
FIG. 2D illustrates an exemplary visualization of a filtered group of objects based on the selected filter criteria from FIG. 2C, according to one or more embodiments.

FIG. 2D illustrates an exemplary visualization 230 of a filtered group of objects based on the selected filter criteria from FIG. 2C, according to one or more embodiments.

As shown, the visualization 230 includes a filtered object marker 235. In some cases, the quantity of object markers 225 is sufficiently large that visualization 210 is cluttered, and objects of particular interest are not readily identified. Virtual configuration management module 140 may filter objects based on one or more filter criteria, resulting in visualization 230, where visualization 230 displays only filtered object markers 235 that meet the one or more filter criteria. For example, referring to FIG. 2C, filtered object markers 235 could be associated with an object with a difference indicator that is greater than 2.

Figure 3A:
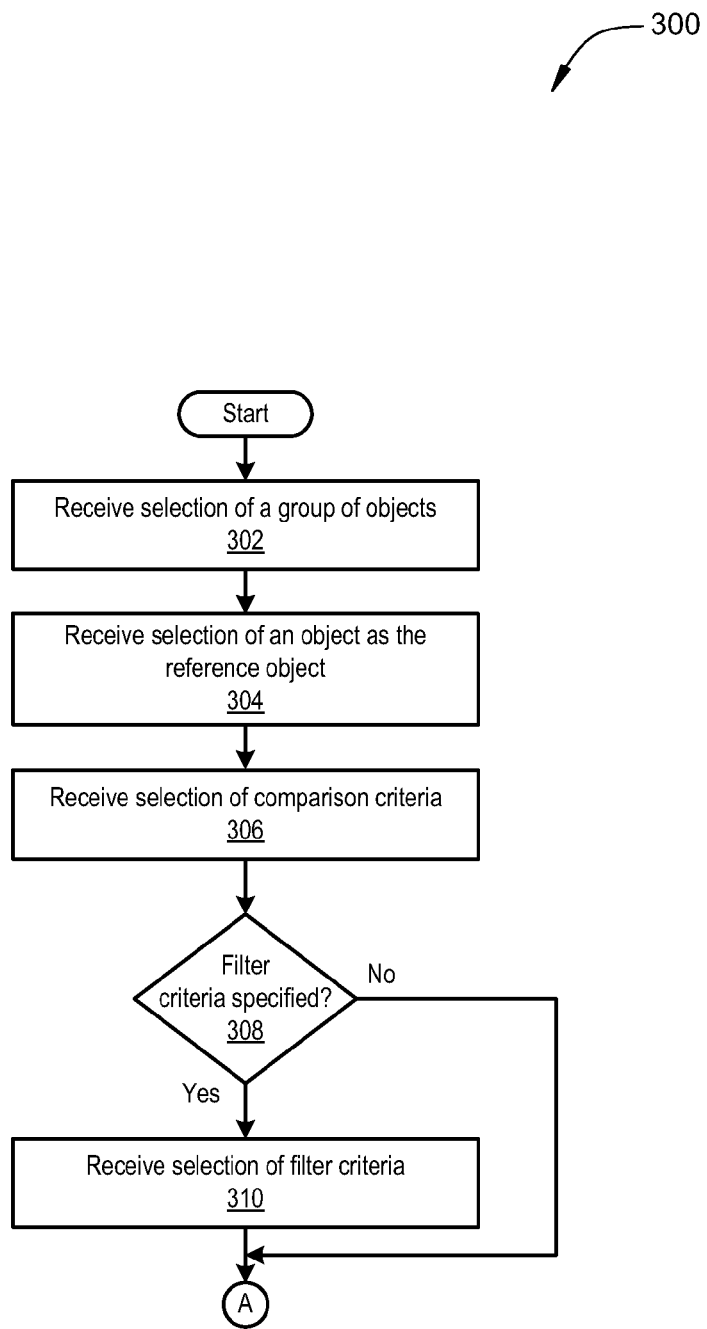
FIGS. 3A-3B set forth a flow diagram of method steps for visualizing a group of objects against a reference object, according to an embodiment.
Figure 3B:
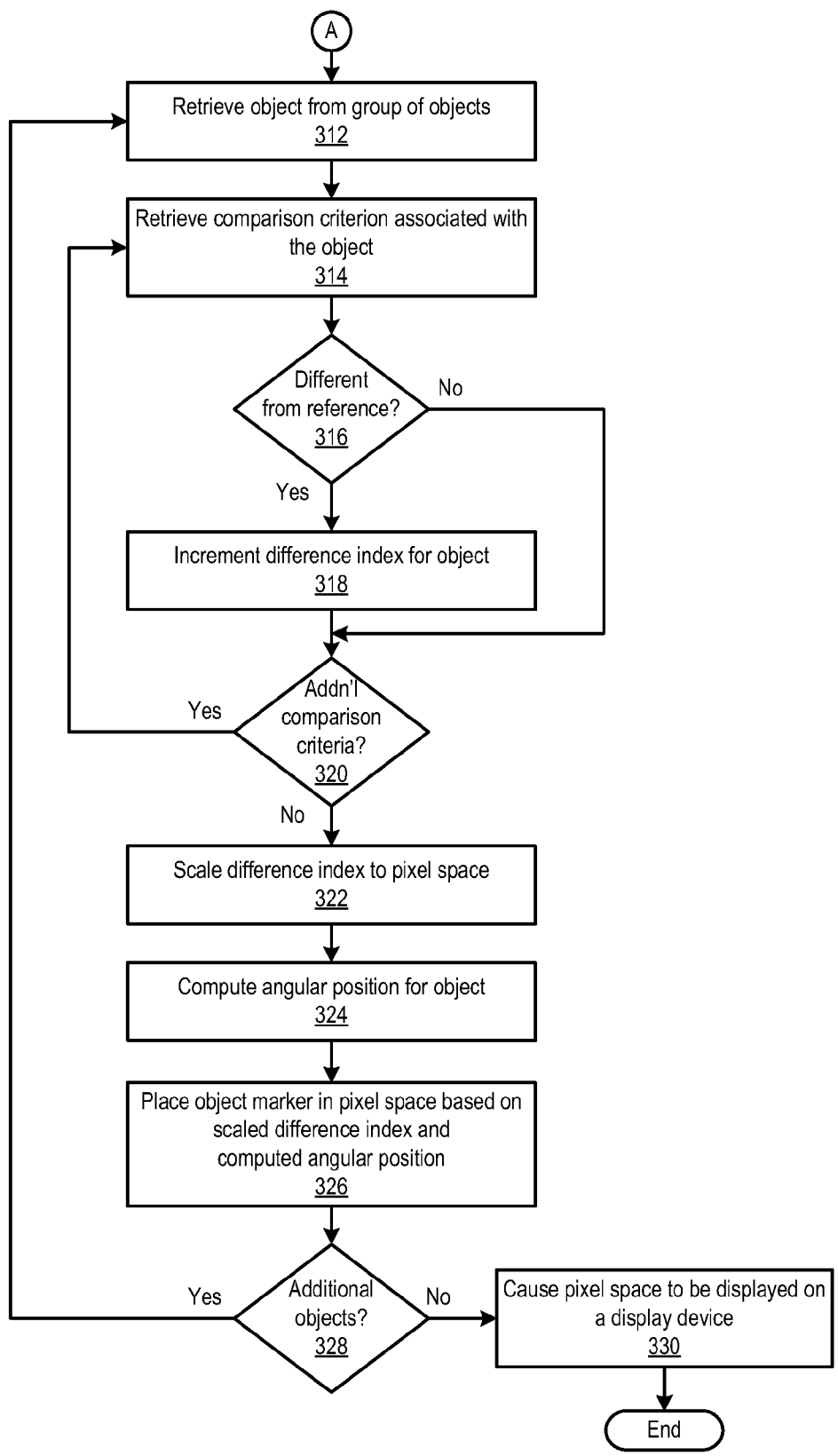

FIGS. 3A-3B set forth a flow diagram of method steps for visualizing a group of objects against a reference object, according to an embodiment. Although the method steps are described in conjunction with the system of FIG. 1, persons of ordinary skill in the art will understand that other similar systems can be configured to perform the method steps.

As shown, a method 300 begins at step 302, where the virtual configuration management module 140 receives a selection of a group of objects. At step 304, the virtual configuration management module 140 receives a selection of an object as the reference object. At step 306, the virtual configuration management module 140 receives a selection of one or more comparison criteria. At step 308, the virtual configuration management module 140 determines whether one or more filter criteria have been specified. If one or more filter criteria have been specified, then the method 300 proceeds to step 310, where the virtual configuration management module 140 receives a selection of one or more comparison criteria.

At step 312, the virtual configuration management module 140 retrieves an object from a group of objects. At step 314, virtual configuration management module 140 retrieves a value of a comparison criterion from a group of comparison criteria associated with the object. At step 316, virtual configuration management module 140 determines whether the retrieved value associated with the retrieved object is different from a corresponding value of the comparison criterion associated with a reference object. If the retrieved value is different from the corresponding value for the reference object, then the method proceeds to step 318, where virtual configuration management module 140 increments a difference indicator corresponding to the retrieved object.

At step 320, virtual configuration management module 140 determines whether there are additional object comparison criteria to compare with corresponding comparison criteria of the reference object. If there are additional object comparison criteria, then the method proceeds to step 314, described above. If, however, there are no additional object comparison criteria, then the method proceeds to step 322, where virtual configuration management module 140 scales the difference indicator to a difference scale corresponding to a display screen region configured to store a visualization of objects. At step 324, virtual configuration management module 140 compute an angular position for the retrieved object. At step 326, virtual configuration management module 140 places an object marker corresponding to the object in the display screen region based on the scaled difference indicator and the computed angular position.

At step 328, virtual configuration management module 140 determines whether there are additional objects to compare with the reference object. If there are additional objects, then the method proceeds to step 312, described above. If, however, there are no additional objects, then the method proceeds to step 330, where virtual configuration management module 140 causes the display screen region to be displayed on a display device. The method 300 then terminates.

Returning to step 316, if the retrieved value is not different from the corresponding value for the reference object, then the method proceeds to step 320, described above.

Returning to step 308, if one or more filter criteria have not been specified, then the method 300 proceeds to step 312, described above.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or the apparatus may be a general purpose computer selectively activated or configured by a computer program stored in the computer. In particular, various general purpose machines may be used with computer programs written in accordance with the teachings herein, or a more specialized apparatus may be constructed to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

It is claimed that:

1. A method of generating a visualization of differences between a plurality of virtual machines that are running in one or more hosts and include first and second virtual machines, and a reference virtual machine that is running in a host, the method comprising:
   for each of the first and second virtual machines that are running in a host:
     retrieving a plurality of parameter values associated with the virtual machine;
     determining a difference between the parameter values associated with the virtual machine and reference values associated with the reference virtual machine running in a host; and
     computing a location of a marker for the virtual machine to be displayed in a display screen region based at least in part on the determined difference, wherein
   if the determined difference for the first virtual machine is greater than that of the second virtual machine, the marker for the first virtual machine is displayed in the display screen region at a location that is farther from a center of the display screen region than the marker for the second virtual machine.

2. The method of claim 1, further comprising, for the first and second virtual machines, logarithmically scaling the determined differences.

3. The method of claim 1, further comprising, for the first and second virtual machines, linearly scaling the determined differences.

4. The method of claim 1, further comprising, for each of the first and second virtual machines:
   generating a pseudorandom number;
   scaling the pseudorandom number between 0 and $2\pi$ radians; and
   selecting an angle related to the scaled pseudorandom number,
   wherein the location in the display screen region is further based on the selected angle.

5. The method of claim 1, further comprising, for each of the first and second virtual machines:
   categorizing the virtual machine into a category within a plurality of categories; and
   selecting an angle based on the category,
   wherein the location in the display screen region is further based on the selected angle.

6. The method of claim 1, further comprising:
   selecting a parameter value from the plurality of parameter values; and
   for each of the first and second virtual machines, calculating an angle based on the selected parameter value relative to the corresponding reference value,
   wherein the location in the display screen region is further based on the calculated angle.

7. The method of claim 1, further comprising, for the first and second virtual machines:
   scaling the determined differences based on a dimension associated with the display screen region.

8. The method of claim 1, further comprising:
   applying a filter to the plurality of virtual machines, the first and second virtual machines being included in filtered virtual machines obtained after the filter is applied.

9. The method of claim 1, further comprising, for each of the first and second virtual machines:
   selecting a parameter value from the plurality of parameter values; and
   for each of the first and second virtual machines, computing a size of the marker based on a difference between the selected parameter value and the corresponding reference value, such that the size becomes larger as the difference between the selected parameter value and the corresponding reference value becomes larger.

10. A non-transitory computer-readable storage medium comprising instructions, which when executed in a computer system, causes the computer system to carry out the steps comprising:
    for each of first and second virtual machines included in a plurality of virtual machines that are running in one or more hosts:
      retrieving a plurality of parameter values associated with the virtual machine;
      determining a difference between the parameter values associated with the virtual machine and reference values associated with a reference virtual machine that is running in a host; and
      computing a location of a marker for the virtual machine to be displayed in a display screen region based at least in part on the determined difference, wherein
    if the determined difference for the first virtual machine is greater than that of the second virtual machine, the marker for the first virtual machine is displayed in the display screen region at a location that is farther from a center of the display screen region than the marker for the second virtual machine.

11. The non-transitory computer-readable storage medium of claim 10, wherein the steps further comprise, for the first and second virtual machines: logarithmically scaling the determined differences.

12. The non-transitory computer-readable storage medium of claim 10, wherein the steps further comprise, for the first and second virtual machines: linearly scaling the determined differences.

13. The non-transitory computer-readable storage medium of claim 10, wherein the steps further comprise, for each of the first and second virtual machines:
    generating a pseudorandom number;
    scaling the pseudorandom number between 0 and a radians; and
    selecting an angle related to the scaled pseudorandom number,
    wherein the location in the display screen region is further based on the selected angle.

14. The non-transitory computer-readable storage medium of claim 10, wherein the steps further comprise, for each of the first and second virtual machines:
    categorizing the virtual machine into a category within a plurality of categories; and
    selecting an angle based on the category,
    wherein the location in the display screen region is further based on the selected angle.

15. The non-transitory computer-readable storage medium of claim 10, wherein the steps further comprise:
    selecting a parameter value from the plurality of parameter values; and
    for each of the first and second virtual machines, calculating an angle based on the parameter value relative to the corresponding reference value, wherein the location in the display screen region is further based on the calculated angle.

16. The non-transitory computer-readable storage medium of claim 10, wherein the steps further comprise:
scaling the determined differences based on a dimension associated with the display screen region.

17. The non-transitory computer-readable storage medium of claim 10, wherein the steps further comprise:
applying a filter to the plurality of virtual machines, wherein the first and second virtual machines are included in filtered virtual machines obtained after the filter is applied.

18. The non-transitory computer-readable storage medium of claim 10, wherein the steps further comprises, for each of the first and second virtual machines:
selecting a parameter value from the plurality of parameter values; and
for each of the first and second virtual machines, computing a size of the marker based on a difference between the selected parameter value and the corresponding reference value, such that the size becomes larger as the difference between the selected parameter value and the corresponding reference value becomes larger.

19. A computer system comprising:
a memory that is configured to store instructions for a program; and
a processor that is configured to execute the instructions for the program to generate a visualization of differences between a plurality of virtual machines that are running in one or more hosts and include first and second virtual machines, and a reference virtual machine that is running in a host, by carrying out the steps comprising:
for each of the first and second virtual machines that are running in a host:
retrieving a plurality of parameter values associated with the virtual machine;
determining a difference between the parameter values associated with the virtual machine and parameter values associated with the reference virtual machine running in a host; and
computing a location of a marker for the virtual machine to be displayed in a display screen region based at least in part on the determined difference, wherein
if the determined difference for the first virtual machine is greater than that of the second virtual machine, the marker for the first virtual machine is displayed in the display screen region at a location that is farther from a center of the display screen region than the marker for the second virtual machine.

20. The computer system of claim 18, wherein the steps further comprise, for each of the first and second virtual machines:
categorizing the virtual machine into a category within a plurality of categories; and
selecting an angle based on the category
wherein the location in the display screen region is further based on the selected angle.

* * * * *